US012487504B2

(12) United States Patent
Stokes et al.

(10) Patent No.: US 12,487,504 B2
(45) Date of Patent: Dec. 2, 2025

(54) UNDERWATER CAMERA SYSTEM CONTROLLER FOR AQUACULTURE BEHAVIOR OBSERVATION

(71) Applicant: TidalX AI Inc, San Ramon, CA (US)

(72) Inventors: Matthew Stokes, Centennial, CO (US); Thomas Robert Swanson, Sunnyvale, CA (US); Harrison Pham, Sunnyvale, CA (US); Riva Gulassa, Sunnyvale, CA (US)

(73) Assignee: TidalX AI Inc., Mountain View, CA (US)

( * ) Notice: Subject to any disclaimer, the term of this patent is extended or adjusted under 35 U.S.C. 154(b) by 177 days.

(21) Appl. No.: 18/139,173

(22) Filed: Apr. 25, 2023

(65) Prior Publication Data

US 2024/0126145 A1 Apr. 18, 2024

Related U.S. Application Data

(60) Provisional application No. 63/415,935, filed on Oct. 13, 2022.

(51) Int. Cl.
  *G03B 17/56* (2021.01)
  *A01K 61/80* (2017.01)
  (Continued)

(52) U.S. Cl.
  CPC ............ *G03B 17/08* (2013.01); *G01S 5/0027* (2013.01); *G03B 17/561* (2013.01); *H04N 23/66* (2023.01);
  (Continued)

(58) Field of Classification Search
  CPC ................. G03B 17/08; G03B 2217/18; G03B 2217/002; H04N 23/66; H04N 23/695;
  (Continued)

(56) References Cited

U.S. PATENT DOCUMENTS 10,856,520 B1 12/2020 Kozachenok et al.
11,297,247 B1 * 4/2022 James .................... H04N 23/90
(Continued)

FOREIGN PATENT DOCUMENTS

CN 108040948 5/2018
EP 2244934 11/2010
(Continued)

OTHER PUBLICATIONS

Extended Search Report in European Appln. No. 22151132.2, dated May 2, 2022, 10 pages.
(Continued)

*Primary Examiner* — Christopher E Mahoney
(74) *Attorney, Agent, or Firm* — Fish & Richardson P.C.

(57) ABSTRACT

Methods, systems, and apparatus, including computer programs encoded on computer-storage media, for automated underwater camera system control for aquaculture systems. An underwater camera system includes (i) a line on which the underwater camera system is mounted, the line detachably affixed to a feeder that provides feed for aquatic livestock, (ii) a sensor manager, (iii) one or more sensors that are managed by the sensor manager, (iv) a line navigation controller, and (v) a first actuator for controlling a distance between the feeder and the underwater camera system. The one or more sensors obtain sensor data and the line navigation controller of the underwater camera system determines a distance to position the underwater camera system beneath the feeder to obtain additional sensor data. The line navigation controller transmits a first message to the first actuator to position the underwater camera system at the determined distance beneath the feeder.

20 Claims, 3 Drawing Sheets

(51) Int. Cl.
  *G01S 5/00* (2006.01)
  *G03B 17/08* (2021.01)
  *H04N 23/66* (2023.01)
  *H04N 23/695* (2023.01)

(52) U.S. Cl.
  CPC .......... *H04N 23/695* (2023.01); *A01K 61/80* (2017.01); *G03B 2217/002* (2013.01); *G03B 2217/18* (2013.01)

(58) Field of Classification Search
  CPC ........ A01K 61/00; A01K 61/10; A01K 61/80; G01S 5/0027
  See application file for complete search history.

(56) References Cited

U.S. PATENT DOCUMENTS

| | | |
|---|---|---|
| 2017/0150701 A1 | 6/2017 | Gilmore et al. |
| 2019/0228218 A1 | 7/2019 | Barnaby et al. |
| 2019/0340440 A1 | 11/2019 | Atwater et al. |
| 2020/0107524 A1 | 4/2020 | Messana et al. |
| 2020/0155882 A1 | 5/2020 | Tohidi et al. |
| 2020/0288678 A1 | 9/2020 | Howe et al. |
| 2021/0360906 A1* | 11/2021 | Yao ................. A01K 61/80 |
| 2022/0217952 A1* | 7/2022 | Messana ............... A01K 29/005 |

FOREIGN PATENT DOCUMENTS

| | | |
|---|---|---|
| EP | 3484283 | 5/2019 |
| JP | 2002171853 | 6/2002 |
| NO | 300401 | 5/1997 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO 2014/179482 | 11/2014 |
| WO | WO 2018/011744 | 1/2018 |
| WO | WO 2019/002881 | 1/2019 |
| WO | WO 2019/121851 | 6/2019 |
| WO | WO 2019/188506 | 10/2019 |
| WO | WO 2019/232247 | 12/2019 |
| WO | WO 2020/046524 | 3/2020 |
| WO | WO 2020/132031 | 6/2020 |
| WO | WO 2021/006744 | 1/2021 |
| WO | WO 2021/030237 | 2/2021 |
| WO | WO 2022/010815 | 1/2022 |
| WO | WO 2020/072438 | 4/2022 |

OTHER PUBLICATIONS

International Preliminary Report on Patentability in International Appln. No. PCT/US2020/059829, dated May 27, 2022, 11 pages.
International Search Report and Written Opinion in International Appln No. PCT/US2022/018651, dated Jun. 22, 2022, 14 pages.
International Search Report and Written Opinion in International Appln No. PCT/US2022/021683, dated Jun. 27, 2022, 14 pages.
International Search Report and Written Opinion in International Appln No. PCT/US2022/022250, dated Jul. 6, 2022, 15 pages.
International Search Report and Written Opinion in International Appln No. PCT/US2022/022492, dated Jun. 28, 2022, 13 pages.
International Search Report and Written Opinion in International Appln No. PCT/US2022/022589, dated Jul. 7, 2022, 12 pages.
International Search Report and Written Opinion in International Appln No. PCT/US2022/022837, dated Aug. 2, 2022, 14 pages.
International Search Report and Written Opinion in International Appln No. PCT/US2022/023831, dated Jul. 8, 2022, 13 pages.
International Search Report and Written Opinion in International Appln. No. PCT/US2020/059829, dated Feb. 25, 2021, 18 pages.
Meidell et al., "FishNet: A Unified Embedding for Salmon Recognition," Thesis for Master's degree in Artificial Intelligence, Norwegian University of Science and Technology, Jun. 2019, 86 pages.
Moskvyak et al., "Robust Re-identification of Manta Rays from Natural Markings by Learning Pose Invariant Embeddings," CoRR, Feb. 2019, arXiv:1902.10847v1, 12 pages.
Petrov et al., "Overview of the application of computer vision technology in fish farming," E3S Web of Conferences, 2020, 175:02015.
Qiu et al., "Improving Transfer Learning and Squeeze-and-Excitation Networks for Small-Scale Fine-Grained Fish Image Classification," IEEE Access, Dec. 2018, 6(31):78503-78512.
Saberloon et al., "Application of machine vision systems in aquaculture with emphasis on fish: state-of-the-art and key issues," Reviews in Aquaculture, Dec. 2017, 9:369-387.
Stein et al., "Consistent melanophore spot patterns allow long-term individual recognition of Atlantic salmon *Salmo salar*," Journal of Fish Biology, Nov. 2017, 91(6):1699-1712.
Towardsdatascience.com [online], "Analyzing Applications of Deep Learning in Aquaculture," Jan. 23, 2021, retrieved on Jan. 30, 2024, retrieved from URL<https://towardsdatascience.com/analyzing-applications-of-deep-learning-in-aquaculture-7a273399553/>, 20 pages.
Wang, "Robust tracking of fish schools using CNN for head identification," Multimedia Tools and Applications, Nov. 2017, 19 pages.

* cited by examiner

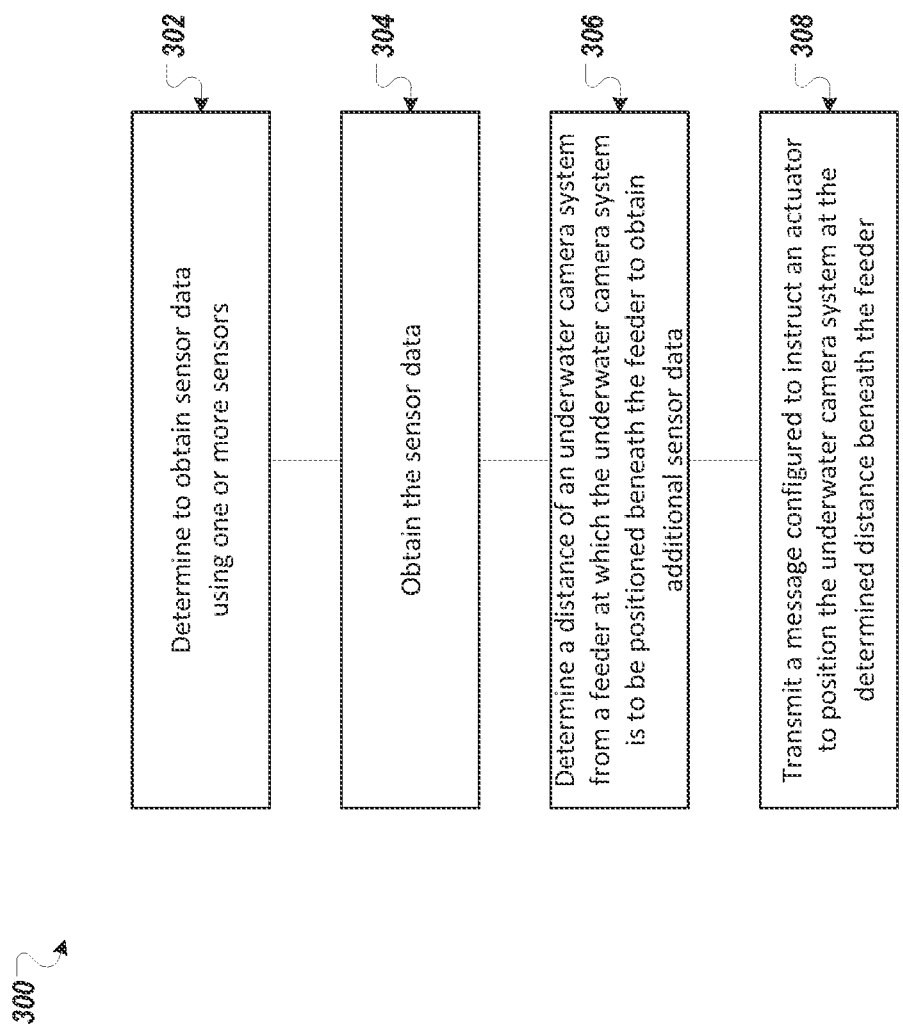

UNDERWATER CAMERA SYSTEM CONTROLLER FOR AQUACULTURE BEHAVIOR OBSERVATION

CROSS-REFERENCE TO RELATED APPLICATION

This application claims the benefit of U.S. Provisional Application No. 63/415,935, filed Oct. 13, 2022, and the contents of this application are hereby incorporated by reference.

FIELD

This specification relates to an automated underwater camera system controller for aquaculture systems.

BACKGROUND

Aquaculture involves the farming of aquatic organisms, such as fish, crustaceans, or aquatic plants. In aquaculture, and in contrast to commercial fishing, freshwater and saltwater fish populations are cultivated in controlled environments. For example, the farming of fish can involve raising fish in tanks, fish ponds, or ocean enclosures.

SUMMARY

In general, innovative aspects of the subject matter described in this specification relate to controlling an underwater camera system affixed to a line beneath a feeder to observe aquaculture feeding behavior. Farming aquaculture livestock may require that the livestock be fed while the livestock grows. For example, salmon being farmed may be fed for three to seven hours a day until the salmon are large enough to be harvested.

A camera system controlled by a human operator can be used to monitor farmed fish as the fish move throughout their enclosure. When camera systems are manually controlled, human factors, such as the attention span or work schedule of the operator, or the comfort of the human operator in extreme weather conditions, can affect the quality of monitoring.

Observing feeding behavior may rely on appropriately using a camera to observe feeding. For example, if a camera is too far from feeding livestock then no feeding behavior may be observed. In another example, if a camera is too close to feeding livestock, then no feeding behavior may be observed as a single livestock may take up an entire view of the camera. Controlling a camera to observe feeding may rely on images of the livestock and feed to determine where the camera should be placed. For example, the camera may be controlled to find feeding livestock, and then positioned an appropriate distance from the feeding livestock to observe feeding behavior.

Feeding behavior of livestock may be observed to obtain useful information. For example, feeding behavior may indicate that livestock are not consuming a large majority of the feed being provided to the livestock so the amount of feed provided to the livestock may be reduced. In another example, feeding behavior may indicate that livestock are quickly consuming feed being provided to the livestock so the rate that feed is provided to the livestock may be increased. In yet another example, feeding behavior may indicate that livestock are unhealthy as they are not consuming as much feed as expected so medication may be provided to the livestock.

A system that provides automated control of an underwater camera system to observe aquaculture feeding behavior may provide more accurate determination of feeding behavior and may increase efficiency in feeding livestock as compared to manual control. For example, the automated control may ensure that the camera is optimally positioned to capture images that show feeding behavior of fish. In another example, the automated control may allow a system to automatically increase a rate that feed is provided to fish while the fish are eating most of the feed, and automatically decrease or stop providing feed to fish when the fish are not eating most of the feed. Accordingly, the system may decrease an amount of waste of feed used in raising livestock by reducing an amount of unconsumed feed and increased yield by providing more feed for fish to consume. Accordingly, environmental concerns and resource expenditure of uneaten food can be reduced.

Specific advantages can be obtained by an underwater camera system that is affixed to a line beneath a feeder. For example, the line-affixed underwater camera system can remain in a general proximity to a column of feed pellets due to being carried by water current in a same general direction as the column of feed pellets. Accordingly, by remaining in a same general area as the feed pellet column even with substantial current conditions, the line-affixed underwater camera system can more quickly, more likely, and more reliably locate and image a column of feed pellets for feeding observation, as compared to winch-based systems, for example. In particular, since the line-affixed system automatically moves with the current, less repositioning of the line-affixed system may be necessary as compared to winch-based systems, thus saving energy and processing resources. Additionally, by remaining in the same general area as the feed pellets, a likelihood of locating the feed pellets is increased, which corresponds to a reduced likelihood of losing and failing to relocate the feed pellets. Accordingly, the line-affixed system can more likely maintain an ability to perform effective feeding control, as compared to winch-based systems. In some implementations, the line-affixed system is self-winching with an internal motor that can be engaged to move the underwater camera system up and down the line. Self-winching behavior can avoid expense and interaction with another external device for vertical positioning.

One innovative aspect of the subject matter described in this specification is embodied in a method that includes determining, by a sensor manager of an underwater camera system that includes (i) a line on which the underwater camera system is mounted, the line detachably affixed to a feeder that provides feed for aquatic livestock, (ii) the sensor manager, (iii) one or more sensors that are managed by the sensor manager, (iv) a line navigation controller, and (v) a first actuator for controlling a distance between the feeder and the underwater camera system, to obtain sensor data using one or more of the sensors. The method further includes: obtaining, by the one or more sensors of the underwater camera system, the sensor data; determining, by the line navigation controller, a distance of the underwater camera system from the feeder at which the underwater camera system is to be positioned beneath the feeder to obtain additional sensor data; and transmitting, by the line navigation controller, a first message configured to instruct the first actuator to position the underwater camera system at the determined distance beneath the feeder.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, the distance to position the underwater camera system beneath the feeder can be determined based at least in part on the sensor data.

In certain aspects, the method further comprises determining, based on the sensor data, a current distance between the underwater camera system and a feed pellet column dispersed by the feeder, wherein the distance to position the underwater camera system beneath the feeder is determined based at least in part on the current distance between the underwater camera system and the feed pellet column.

In some implementations, the distance to position the underwater camera system beneath the feeder is determined based at least in part on a current vertical position of the underwater camera system and the sensor data.

In certain aspects, the underwater camera system further includes a second actuator for controlling an amount and type of drag of the underwater camera system and a drag mechanism controller and the method further comprises: determining, by the drag mechanism controller of the underwater camera system, the amount and type of drag; and transmitting, by the drag mechanism controller, a second message to the second actuator to adjust the drag mechanism to create the amount and type of drag.

In some implementations, the amount and type of drag is determined based on one or more of the current vertical position of the underwater camera system, the current distance between the underwater camera system and the feed pellet column, and the sensor data.

In certain aspects, the sensors of the underwater camera system are included in a rotation mechanism that is rotatable around the underwater camera system and the method further comprises: determining, by the sensor manager, an amount and type of rotation; and transmitting, by the sensor manager, a message to the rotation mechanism to rotate the rotation mechanism by the amount and type of rotation.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIG. 3 is a flow diagram for an example process of controlling an underwater camera system to observe aquaculture feeding behavior.

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
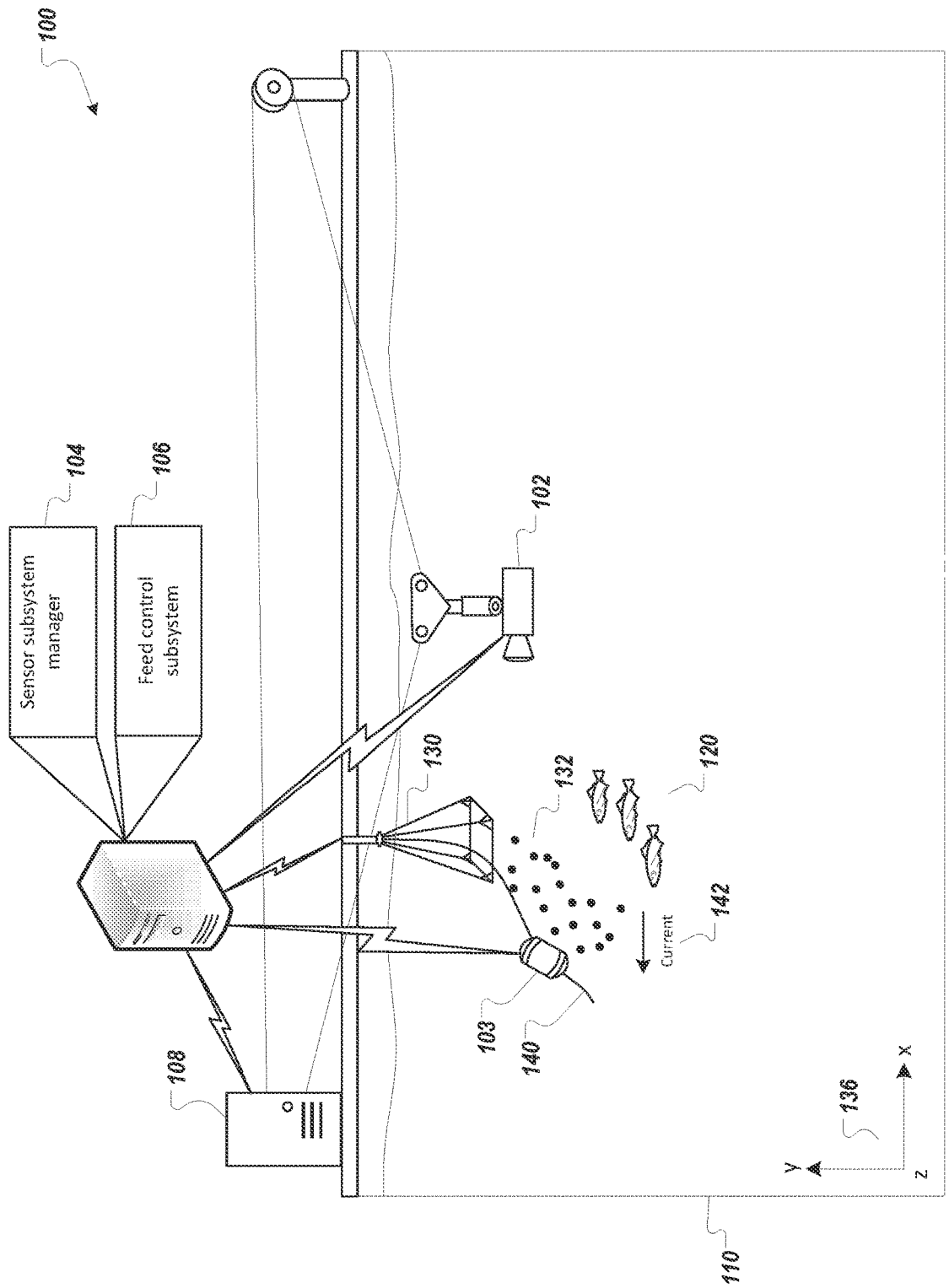
FIG. 1 is a diagram of an example feeding behavior monitoring system and an enclosure that contains aquatic livestock.

FIG. 1 depicts an example feeding behavior monitoring system 100 and an enclosure 110 that contains aquatic livestock. The livestock can be aquatic creatures, such as fish 120 swimming freely within the confines of the enclosure 110. In some implementations, the aquatic livestock can include finfish, juvenile fish, koi fish, sharks, salmon, bass, and others. In addition to the aquatic livestock, the enclosure 110 contains water, e.g., seawater, freshwater, or rainwater, although the enclosure can contain any fluid that is capable of sustaining a habitable environment for the aquatic livestock. The feeding behavior monitoring system 100 can include a first sensor subsystem 102 and/or a second sensor subsystem 103. The feeding behavior monitoring system can also include a sensor subsystem manager 104, a feed control subsystem 106, a winch subsystem 108, and a feeder 130.

The feeder 130 delivers feed 132 to the fish 120. Although the feeder 130 is shown as a subfeeder that is positioned beneath the surface of the water, other types of feeders can be used. The feeder 130 may be a circular spreader, a linear spreader, or no spreader.

A Cartesian coordinate system 136 is provided for ease of reference. Although FIG. 1 shows the enclosure 110 extending in the xy-plane, the enclosure further extends in the z-direction, with the positive z-direction extending out of the page of the drawing.

As described below, the first sensor subsystem 102 can be controlled using the sensor subsystem manager 104 and the winch subsystem 108. The winch subsystem 108 can include one or more motors, one or more power supplies, and one or more pulleys to which one or more cords which suspend the first sensor subsystem 102 are attached. The second sensor subsystem 103, in contrast, can be affixed to a line 140 that extends below the feeder 130. The second sensor subsystem 103 can provide various advantages over the first sensor subsystem 102, as described below.

In general, the feeding behavior monitoring system 100 can be used to monitor feeding behavior of aquatic livestock. For example, the system 100 may be used to determine, where, how much, and for long fish are feeding within the enclosure 110. The feeding behavior monitoring system 100 may control feeding based on the feeding behavior that is observed by either the first sensor subsystem 102 or the second sensor subsystem 103. For example, the system 100 may determine that the fish are no longer eating the feed and, in response, stop providing feed. In another example, the system 100 may determine that the fish are eating the feed but also a large portion of the feed is uneaten by the fish and, in response, reduce a rate that feed is being provided to the fish. In yet another example, the system 100 may determine that the fish are quickly eating all the feed and, in response, increase a rate that feed is being provided to the fish.

In further detail, the sensor subsystem manager 104 can be communicatively coupled to the first sensor subsystem 102 and/or the second sensor subsystem 103. Additionally, the sensor subsystem manager 104 can be communicatively coupled to the feed control subsystem 106. For example, the sensor subsystem manager 104 may provide instructions to the feed control subsystem 106 to request that the feed control subsystem 106 control the feeder 130 to start providing feed, stop providing feed, increase a rate that feed is provided, or decrease a rate that feed is provided. The sensor subsystem manager 104 may use sensor data obtained from the first sensor subsystem 102 and/or the second sensor subsystem 103 to control feeding through the feed control subsystem 106. For example, the feed control subsystem 106 may directly control the feeder 130 and the sensor subsystem manager 104 may determine changes to feeding and instruct the feed control subsystem 106 to control the feeder 130 to make those changes.

The first sensor subsystem 102 and the second sensor subsystem 103 can each include one or more sensors that can monitor the livestock. The first sensor subsystem 102 and the second sensor subsystem 103 may each be waterproof and able to withstand the effects of external forces, such as typical ocean currents, without breaking. The first sensor subsystem 102 and the second sensor subsystem 103 can each include one or more sensors that acquire sensor data, e.g., images and video footage, thermal imaging, heat signatures, sonar data, etc., according to the types of sensors of the respective sensor subsystem. For example, the first sensor subsystem 102 and the second sensor subsystem 103 can each include one or more of the following sensors: a camera, an IR sensor, a UV sensor, a heat sensor, a pressure sensor, a hydrophone, a water current sensor, or a water quality sensor such as one that detects oxygen saturation or an amount of a dissolved solid.

Regarding positioning of the first sensor subsystem 102, the sensor subsystem manager 104 may position the first sensor subsystem 102 to observe feeding behavior based on the feeder 130. For example, the winch subsystem 108 can receive instructions from the sensor subsystem manager 104 and activate one or more motors to move the first sensor subsystem 102 to the position corresponding to the instructions.

In general, observing feeding behavior may be challenging as the first sensor subsystem 102 or the second sensor subsystem 103 may need to be positioned appropriately to observe feeding behavior. For example, if the first sensor subsystem 102 or the second sensor subsystem 103 is positioned too far from where fish are feeding, then no feeding behavior may be observed. In another example, if the first sensor subsystem 102 or the second sensor subsystem is positioned too close to where fish are feeding, then a fish passing immediately next to a respective sensor subsystem may block anything else from being sensed besides that fish. In general, a distance of six feet from feeding may be an optimal amount of distance to observe feeding. For example, six feet of distance from feeding may allow a camera to have a view of feed sinking while at the same time having a view of multiple fish eating the feed. The optimal distance may vary based on various conditions. For example, the optimal distance may be greater when the water is more clear or more sunlight is shining on feed.

As another example, positioning of the first sensor subsystem 102 using the winch subsystem 108 may be challenging due to a drift of the feed 132 through the water based on current 142 of the water. The feed 132 can form, for example, a column of feed pellets that fall through the water after being dispersed, for example in a circle, by the feeder 130. While an initial position of the column of feed pellets can be determined based on a known position of the feeder 130, the column of feed pellets may drift due to an existing direction and speed of the current 142. The feed pellet column may be pushed back and forth, based on the current 142, for example. A size of the enclosure 110 and a drift of the feed pellet column can pose challenges for finding the column of feed pellets using the winch-based first sensor subsystem 102. A fixed winch system with, for example two lines, may have limitations with respect to being repositioned in reaction to a feed pellet column drift. For example, the feed pellet column may move too far away and too quickly from the first sensor subsystem 102 for the first sensor subsystem 102 to relocate the feed pellet column. A camera of the first sensor subsystem 102 may be facing a wrong direction, the feed pellets may be too far away from the first sensor subsystem 102 to be reliably detected, etc.

In contrast, given that the second sensor subsystem 103 is attached to the line 140 that is beneath the feeder 130, the second sensor subsystem 103 will generally be pulled by the current 142 in a same direction that the feed pellet column is being pulled or carried by the current 142. Accordingly, the second sensor subsystem 103 will be in a same general area as the pellets in the food column. That is, as the second sensor subsystem 103 gets carried by the current 142, the second sensor subsystem 103 can automatically be closer to the feed pellet column, before any possible adjustments are made, than the first sensor subsystem 102. As a result, the second sensor subsystem 103 can more easily and more reliably locate the feed pellet column, as compared to the first sensor subsystem 102. Furthermore, the second sensor subsystem 103 can be shaped, e.g., using an approach such as used for shaping a weathervane, to move with the current 142 and maintain a certain orientation.

While the second sensor subsystem 103 can remain in a same general area as the feed pellet column due to drifting with the current 142 along with the feed pellet column, the second sensor subsystem 103 can include different mechanisms for repositioning itself and for locating the feed pellet column. For example, and as described in more detail below, the second sensor subsystem 103 can include one or more drag mechanisms (e.g., fins, ears, etc.) that can be adjusted to increase or reduce drag to affect movement of the second sensor subsystem 103 (e.g., in an X and/or Z direction). As another example, a vertical (e.g., line) positioning mechanism can be activated to adjust a vertical position of the second sensor subsystem 103. The vertical positioning mechanism can be, for example, an internal motor internal to the second sensor subsystem 103 or can be a motor that is external to the second sensor subsystem 103, such as a motor affixed to the feeder 130. The second sensor subsystem 103 can also include, for instance, a rotating mechanism that enables rotation of sensors (e.g., image sensors of a camera, sonar sensors) in a 360 degree arc for locating and imaging the feed pellet column. Actuating different and different combinations of drag adjustment, vertical position, and rotation can be performed to position the second sensor subsystem 103 in a preferred position or alignment with respect to observing the feed pellet column, as described in more detail below.

For example, drag and vertical position of the second sensor subsystem 103 can be varied to move the second sensor subsystem 103 towards or near a denser cloud of feed pellets. For instance, the second sensor subsystem 103 can obtain image data of images around the second sensor subsystem 103, determine a location of a largest density of pellets, determine an amount and type of drag and/or an amount and type of vertical adjustment that would likely reposition the second sensor subsystem 103 to a desired location with respect to the observed feed pellets, and correspondingly adjust drag and/or vertical positon to reposition the second sensor subsystem 103. A desired position can be a predefined distance (e.g., six feet) from (e.g., outside of) the feed pellet column. Maintaining the desired position can decrease a likelihood of fish bumping into the second sensor subsystem 103 or the second sensor subsystem 103 startling the fish, for example.

As an example, as feed is dispersed, the second sensor subsystem 103 can be at a vertical position near the feeder 130, and as pellets begin dropping a vertical position of the second sensor subsystem 103 can be controlled to cause the second sensor subsystem 103 to descend in the water. A first initial amount of drag can be imparted to the second sensor subsystem 103. Drag can be imparted because the current 142 may have a stronger effect on the second sensor subsystem 103 than on the feed pellets, for example. The second sensor subsystem 103 can observe the feed pellets and can attempt to adjust drag and/or vertical position accordingly as the pellets appear to be moving farther away or coming closer to the second sensor subsystem 103.

Figure 2:
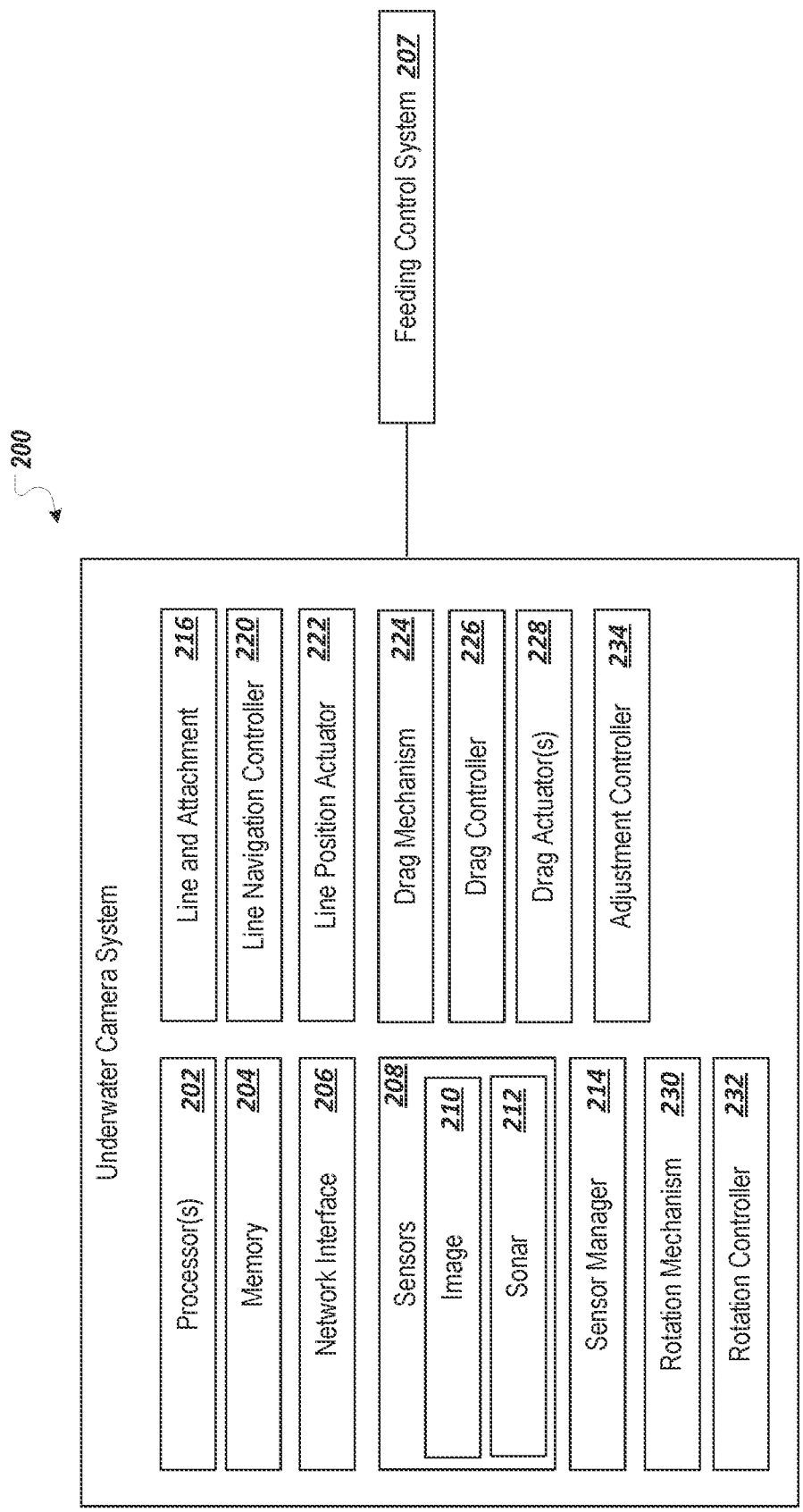
FIG. 2 depicts an example underwater camera system for performing the operations according to the implementations of the present disclosure.

FIG. 2 depicts an example underwater camera system 200. The underwater camera system 200 can be used for performing operations according to the implementations of the present disclosure. The underwater camera system 200 can be implemented by a combination of hardware, software and firmware. The underwater camera system 200 can be the second sensor subsystem 103 described above with respect to FIG. 1, for example.

The underwater camera system 200 includes one or more processors 202, memory 204 (and/or other storage), and a network interface 206. The network interface 206 can be used to connect the underwater camera system 200 to one or more shore-based systems, such as a feeding control system 207. The network interface 206 can also provide power to the underwater camera system 200.

The underwater camera system 200 can include various types of sensors 208. For example, the sensors 208 can include image sensor(s) 210 (e.g., associated with one or more cameras), sonar sensor(s) 212, and other types of sensors, as described above. The sensors 208 can be managed by a sensor manager 214.

The underwater camera system 200 can include (or be connected to) a line 216 and corresponding attachment. The line 216 can be affixed beneath a feeder of the feeding control system 207, for example. A line navigation controller 220 can control a distance between the feeder and the underwater camera system 200, for example, by sending messages to a line position actuator 222. In some implementations, the line position actuator 222 is physically included in the underwater camera system 200. In other implementations, the line navigation controller 220 sends messages to an external device that can move the underwater camera system 200 up or down the line 216.

The underwater camera system 200 also includes a drag mechanism 224. The drag mechanism 224 can be ears, fins, tail(s), sails, or other types of components that are affixed to the underwater camera system 200 and which can be adjusted in response to a drag controller 226 sending messages to one or more drag actuators 228 to, for example, change a shape and/or position of the drag mechanism 224. The drag controller 226 can send a message to a drag actuator 228 to increase, decrease, or otherwise change drag of the drag mechanism 224 so as to move the underwater camera system within an X-Z plane.

The underwater camera system 200 also includes a rotation mechanism 230 (or apparatus) that can rotate the sensors in a 360-degree rotation around the underwater camera system 200. The rotation mechanism 230 can rotate the underwater camera system 200 in response to commands received from a rotation controller 232.

In some implementations, an adjustment controller 234 can execute one or more algorithms to collectively determine an amount and type of drag adjustment, an amount and direction of vertical movement, and/or an amount of 360-degree rotation of the underwater camera system 200 to position and/or align the underwater camera system 200 in a preferred position for observation of a feed pellet column that has been dispersed by the feed control system 207. The adjustment controller 234 can determine the amount and type of drag adjustment, the amount and direction of vertical movement, and/or the amount of rotation based on one or more of a determined current distance between the feed pellet column and the underwater camera system 200, a previous distance between the feed pellet column and the underwater camera system 200, an estimated direction and speed of water current, current drag mechanism settings, a current vertical position of the underwater camera system 200 on the line 216, an estimated rate of vertical fall of feed pellets in the feed pellet column, past adjustments to drag, vertical position, and rotation, or other factors. The distance between the underwater camera system 200 and the feed pellet column can be estimated based on a known size of feed pellets, for example. The amount and type of drag, the amount and direction of vertical movement, and an amount and direction of rotation can be determined so as to position the underwater camera system 200 in a preferred position such as facing the feed pellet column at or close to a preferred predetermined distance (e.g. six feet) from the feed pellet column. After the adjustment controller 234 has determined the amount and type of drag, the amount and direction of vertical movement, and the amount and direction of rotation, the adjustment controller 234 can send respective and corresponding information to the line navigation controller 220, the drag controller 226, and/or the rotation controller 232, for carrying out appropriate adjustments of the underwater camera system 200.

FIG. 3 is a flow diagram for an example process 300 for controlling an underwater camera system to observe aquaculture feeding behavior. The example process 300 may be performed by various systems, including the underwater camera system 200 of FIG. 2.

The process 300 includes determining to obtain sensor data using one or more sensors of an underwater camera system (302). For example, the sensor manager 214 can determine to obtain sensor data, such as images from the image sensors 210 of a camera or sonar data from the sonar sensors 212. The underwater camera system can include i) a line on which the underwater camera system is mounted, where the line is detachably affixed to the feeder, (ii) the sensor manager, (iii) one or more sensors that are managed by the sensor manager, (iv) a line navigation controller, and (v) a first actuator for controlling a distance between the feeder and the underwater camera system. The sensor manager 214 can determine to obtain sensor data based on a repeating periodic interval. For example, the sensor manager 214 can determine to obtain sensor data every second, every five seconds, etc. As another example, the sensor manager 214 can determine to (at least initially) obtain sensor data in response to receiving a notification of an event, such as a dispersal of food pellets.

The process 300 further includes obtaining the sensor data (304). For example, the sensor manager 214 can obtain the image data from the image sensors 210 and/or the sonar data from the sonar sensors 212.

The process 300 further includes determining a distance of the underwater camera system at which the underwater camera system is to be positioned beneath the feeder to obtain additional sensor data (306). For example, the line navigation controller 220 can determine the distance. Additionally, the process 300 can include determining an amount and type of drag to impart to the underwater camera system. For example, the drag controller 226 can determine an amount and type of drag to impart to the underwater camera system 200. The distance to position the underwater camera system beneath the feeder and/or the amount and type of drag can be determined based at least in part on the sensor data. The sensor data can be used to determine a current distance between the underwater camera system and a feed pellet column dispersed by the feeder and the distance to position the underwater camera system beneath the feeder and/or the amount and type of drag can be determined based at least in part on the current distance between the underwater camera system and the feed pellet column.

The process 300 further includes transmitting a message configured to instruct an actuator to position the underwater camera system at the determined distance beneath the feeder (308). For example, the line navigation controller 220 can transmit a message to the line position actuator 222. As another example, the drag controller 226 can send a message to the drag actuators 228 to affect the drag mechanism 224 to impart the previously-determined amount and type of drag.

The process 300 can include other operations, such as determining an amount and type of rotation and transmitting one or more messages to rotate the underwater camera system by the amount and type of rotation. As another example, the process 300 can include obtaining the additional sensor data after the underwater camera system has been moved to the determined distance beneath the feeder (and after application of drag adjustment and/or rotation, for example).

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A computer-implemented method comprising:
   determining, by a sensor manager of an underwater camera system that includes (i) a line on which the underwater camera system is mounted, the line detachably affixed to a feeder that provides feed for aquatic livestock, (ii) the sensor manager, (iii) one or more sensors that are managed by the sensor manager, (iv) a line navigation controller, and (v) a first actuator for controlling a distance between the feeder and the underwater camera system, to obtain sensor data using the one or more sensors;
   obtaining, by the one or more sensors of the underwater camera system, the sensor data;
   determining, by the line navigation controller, a distance of the underwater camera system from the feeder at which the underwater camera system is to be positioned beneath the feeder to obtain additional sensor data; and
   transmitting, by the line navigation controller, a first message configured to instruct the first actuator to position the underwater camera system at the determined distance beneath the feeder.

2. The computer-implemented method of claim 1, wherein the distance to position the underwater camera system beneath the feeder is determined based at least in part on the sensor data.

3. The computer-implemented method of claim 2, further comprising determining, based on the sensor data, a current distance between the underwater camera system and a feed pellet column dispersed by the feeder; and
   wherein the distance to position the underwater camera system beneath the feeder is determined based at least in part on the current distance between the underwater camera system and the feed pellet column.

4. The computer-implemented method of claim 3, wherein the distance to position the underwater camera system beneath the feeder is determined based at least in part on a current vertical position of the underwater camera system and the sensor data.

5. The computer-implemented method of claim 4:
   wherein the underwater camera system further includes:
      1) a second actuator for controlling an amount and type of drag imparted by a drag mechanism of the underwater camera system, and 2) a drag mechanism controller; and
   wherein the method further comprises:
      determining, by the drag mechanism controller of the underwater camera system, the amount and type of drag; and
      transmitting, by the drag mechanism controller, a second message configured to instruct the second actuator to adjust at least one drag mechanism to create the amount and type of drag.

6. The computer-implemented method of claim 5, wherein the amount and type of drag is determined based on one or more of the current vertical position of the underwater camera system, the current distance between the underwater camera system and the feed pellet column, and the sensor data.

7. The computer-implemented method of claim 1:
   wherein the sensors of the underwater camera system are included in a rotation mechanism that is rotatable around the underwater camera system; and
   wherein the method further comprises:
      determining, by the sensor manager, an amount and type of rotation; and
      transmitting, by the sensor manager, a message to the rotation mechanism to rotate the rotation mechanism by the amount and type of rotation.

8. An underwater camera system comprising:
   a line on which the underwater camera system is mounted, wherein the line is detachably affixed to a feeder that provides feed for aquatic livestock;
   a sensor manager,
   one or more sensors that are managed by the sensor manager,
   a line navigation controller,
   a first actuator for controlling a distance between the feeder and the underwater camera system; and
   one or more processors that are configured to:
      determine to obtain sensor data using one or more of the sensors;
      obtain the sensor data;
      determine a distance of the underwater camera system from the feeder at which the underwater camera system is to be positioned beneath the feeder to obtain additional sensor data; and
transmit a first message configured to instruct the first actuator to position the underwater camera system at the determined distance beneath the feeder.

9. The underwater camera system of claim 8, wherein the distance to position the underwater camera system beneath the feeder is determined based at least in part on the sensor data.

10. The underwater camera system of claim 9, wherein the one or more processors are further configured to determine, based on the sensor data, a current distance between the underwater camera system and a feed pellet column dispersed by the feeder; and
wherein the distance to position the underwater camera system beneath the feeder is determined based at least in part on the current distance between the underwater camera system and the feed pellet column.

11. The underwater camera system of claim 10, wherein the distance to position the underwater camera system beneath the feeder is determined based at least in part on a current vertical position of the underwater camera system and the sensor data.

12. The underwater camera system of claim 11, further comprising:
a second actuator for controlling an amount and type of drag of the underwater camera system;
at least one drag mechanism; and
a drag mechanism controller; and
wherein the drag mechanism controller is configured to:
determine the amount and type of drag; and
transmit a second message to the second actuator to adjust at least one drag mechanism to create the amount and type of drag.

13. The underwater camera system of claim 12, wherein the amount and type of drag is determined based on one or more of the current vertical position of the underwater camera system, the current distance between the underwater camera system and the feed pellet column, and the sensor data.

14. The underwater camera system of claim 8:
wherein the sensors of the underwater camera system are included in a rotation mechanism that is rotatable around the underwater camera system; and
wherein the sensor manager is configured to:
determine an amount and type of rotation; and
transmit a message to the rotation mechanism to rotate the rotation mechanism by the amount and type of rotation.

15. One or more non-transitory computer storage media encoded with computer program instructions that when executed by one or more computers cause the one or more computers to perform operations comprising:
determining, by a sensor manager of an underwater camera system that includes (i) a line on which the underwater camera system is mounted, the line detachably affixed to a feeder that provides feed for aquatic livestock, (ii) the sensor manager, (iii) one or more sensors that are managed by the sensor manager, (iv) a line navigation controller, and (v) a first actuator for controlling a distance between the feeder and the underwater camera system, to obtain sensor data using the one or more sensors;
obtaining, by the one or more sensors of the underwater camera system, the sensor data;
determining, by the line navigation controller, a distance of the underwater camera system from the feeder at which the underwater camera system is to be positioned beneath the feeder to obtain additional sensor data; and
transmitting, by the line navigation controller, a first message configured to instruct the first actuator to position the underwater camera system at the determined distance beneath the feeder.

16. The media of claim 15, wherein the operations comprise determining, based on the sensor data, a current distance between the underwater camera system and a feed pellet column dispersed by the feeder; and
wherein the distance to position the underwater camera system beneath the feeder is determined based at least in part on the current distance between the underwater camera system and the feed pellet column.

17. The media of claim 16, wherein the distance to position the underwater camera system beneath the feeder is determined based at least in part on a current vertical position of the underwater camera system and the sensor data.

18. The media of claim 17:
wherein the underwater camera system further includes:
1) a second actuator for controlling an amount and type of drag imparted by a drag mechanism of the underwater camera system, and 2) a drag mechanism controller; and
wherein the operations further comprise:
determining, by the drag mechanism controller of the underwater camera system, the amount and type of drag; and
transmitting, by the drag mechanism controller, a second message to the second actuator to adjust at least one drag mechanism to create the amount and type of drag.

19. The media of claim 18, wherein the amount and type of drag is determined based on one or more of the current vertical position of the underwater camera system, the current distance between the underwater camera system and the feed pellet column, and the sensor data.

20. The media of claim 15:
wherein the sensors of the underwater camera system are included in a rotation mechanism that is rotatable around the underwater camera system; and
wherein the method further comprises:
determining, by the sensor manager, an amount and type of rotation; and
transmitting, by the sensor manager, a message to the rotation mechanism to rotate the rotation mechanism by the amount and type of rotation.

* * * * *